US011258758B1

(12) United States Patent
Xie

(10) Patent No.: US 11,258,758 B1
(45) Date of Patent: Feb. 22, 2022

(54) BLOCKING DOWNLOAD OF CONTENT

(71) Applicant: Palo Alto Networks, Inc., Santa Clara, CA (US)

(72) Inventor: Huagang Xie, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 16/785,429

(22) Filed: Feb. 7, 2020

Related U.S. Application Data

(63) Continuation of application No. 15/233,865, filed on Aug. 10, 2016, now Pat. No. 10,601,775, which is a continuation of application No. 13/019,218, filed on Feb. 1, 2011, now Pat. No. 9,461,878.

(51) Int. Cl.
*H04L 29/06* (2006.01)
*H04L 67/06* (2022.01)
*H04L 67/01* (2022.01)
*H04L 67/02* (2022.01)

(52) U.S. Cl.
CPC .......... *H04L 63/0236* (2013.01); *H04L 67/06* (2013.01); *H04L 67/02* (2013.01); *H04L 67/42* (2013.01)

(58) Field of Classification Search
CPC ..... H04L 63/0236; H04L 67/06; H04L 67/02; H04L 67/42
See application file for complete search history.

(56) References Cited

U.S. PATENT DOCUMENTS

| 5,870,546 | A  | 2/1999  | Kirsch |
| 6,119,101 | A  | 9/2000  | Peckover |
| 6,253,027 | B1 | 6/2001  | Weber |
| 6,345,300 | B1 | 2/2002  | Bakshi |
| 6,421,733 | B1 | 7/2002  | Tso |
| 6,623,527 | B1 | 9/2003  | Hamzy |
| 7,076,562 | B2 | 7/2006  | Singhal |
| 7,191,448 | B2 | 3/2007  | Simpson |
| 7,206,932 | B1 | 4/2007  | Kirchhoff |
| 7,272,853 | B2 | 9/2007  | Goodman |
| 7,478,422 | B2 | 1/2009  | Valente |
| 7,519,990 | B1 | 4/2009  | Xie |
| 7,617,317 | B2 | 11/2009 | Jones |
| 7,647,404 | B2 | 1/2010  | Cooper |
| 7,698,398 | B1 | 4/2010  | Lai |
| 7,783,757 | B2 | 8/2010  | Plamondon |
| 7,797,421 | B1 | 9/2010  | Scofield |
| 7,849,507 | B1 | 12/2010 | Bloch |
| 7,895,445 | B1 | 2/2011  | Albanese |
| 7,941,838 | B2 | 5/2011  | Diaz Cuellar |

(Continued)

OTHER PUBLICATIONS

Overhaul: Input-Driven Access Control for Better Privacy on Traditional Operating Systems, Onarlioglu et al, Jun. 2016 (Year: 2016).*

(Continued)

*Primary Examiner* — Jahangir Kabir
(74) *Attorney, Agent, or Firm* — Van Pelt, Yi & James LLP

(57) ABSTRACT

At least initially blocking client download of certain content and injecting a user verification step for such downloads is disclosed. In some embodiments, client download of a response from a server to a client request is blocked, and instead a notification page with options to accept or decline the server response is provided to the client.

54 Claims, 4 Drawing Sheets

(56) References Cited

U.S. PATENT DOCUMENTS

| | | | |
|---|---|---|---|
| 7,958,245 B2 | 6/2011 | Thomas | |
| 8,046,833 B2 | 10/2011 | Gustafson | |
| 8,127,008 B2 | 2/2012 | Manning | |
| 8,140,647 B1 * | 3/2012 | Juillard | H04L 67/06 |
| | | | 709/219 |
| 8,200,761 B1 | 6/2012 | Tevanian | |
| 8,244,886 B2 | 8/2012 | Short | |
| 8,255,985 B2 | 8/2012 | Aaron | |
| 8,266,672 B2 | 9/2012 | Moore | |
| 8,272,045 B2 | 9/2012 | Azeez | |
| 8,464,318 B1 | 6/2013 | Hallak | |
| 9,003,509 B1 | 4/2015 | Movshovitz | |
| 9,071,367 B2 * | 6/2015 | Abhyanker | G06Q 50/01 |
| 9,628,355 B1 * | 4/2017 | Deshpande | H04L 43/00 |
| 10,594,776 B2 * | 3/2020 | Yi | H04L 67/06 |
| 2002/0002602 A1 * | 1/2002 | Vange | H04L 47/24 |
| | | | 709/219 |
| 2002/0194140 A1 | 12/2002 | Makuck | |
| 2003/0037108 A1 | 2/2003 | Peiffer | |
| 2003/0088788 A1 | 5/2003 | Yang | |
| 2003/0126230 A1 | 7/2003 | Donatelli | |
| 2003/0177196 A1 | 9/2003 | Bhasin | |
| 2003/0187976 A1 | 10/2003 | Decime | |
| 2003/0220901 A1 | 11/2003 | Carr | |
| 2004/0093520 A1 | 5/2004 | Lee | |
| 2004/0117426 A1 | 6/2004 | Rudkin | |
| 2005/0015626 A1 | 1/2005 | Chasin | |
| 2005/0021999 A1 | 1/2005 | Touitou | |
| 2006/0059238 A1 | 3/2006 | Slater | |
| 2006/0161966 A1 | 7/2006 | Nagampalli | |
| 2006/0190482 A1 | 8/2006 | Kishan | |
| 2006/0195660 A1 | 8/2006 | Sundarrajan | |
| 2006/0253582 A1 | 11/2006 | Dixon | |
| 2007/0169170 A1 | 7/2007 | Shiran | |
| 2007/0192467 A1 | 8/2007 | Keeler | |
| 2007/0261112 A1 * | 11/2007 | Todd | G06F 21/577 |
| | | | 726/11 |
| 2007/0266149 A1 | 11/2007 | Cobb | |
| 2008/0178278 A1 | 7/2008 | Grinstein | |
| 2008/0228772 A1 | 9/2008 | Plamondon | |
| 2008/0229017 A1 | 9/2008 | Plamondon | |
| 2008/0235106 A1 | 9/2008 | Reisman | |
| 2009/0067440 A1 | 3/2009 | Chadda | |
| 2009/0106777 A1 | 4/2009 | Blaisdell | |
| 2009/0132813 A1 | 5/2009 | Schibuk | |
| 2009/0193129 A1 | 7/2009 | Agarwal | |
| 2010/0005171 A1 | 1/2010 | Arolovitch | |
| 2010/0088404 A1 | 4/2010 | Mani | |
| 2010/0250497 A1 | 9/2010 | Redlich | |
| 2010/0325357 A1 | 12/2010 | Reddy | |
| 2011/0202427 A1 * | 8/2011 | Garcia Jurado Suarez | |
| | | | H04L 65/1069 |
| | | | 705/26.35 |
| 2012/0036178 A1 | 2/2012 | Gavini | |

OTHER PUBLICATIONS

Sendio, Inc., 'Sendio® E-mail Security Platform User Guide',© 2008, Sendio, Inc., entire document, https://www.sendio.com/wp-content/uploads/2014/08/ESP-UserGuide-SENDIO5-08122014.pdf.

Process Software, 'TCPware for OpenVMS [Software Product Description]', Mar. 2014, © Process Software, entire document, http://www.process.com/psc/fileadmin/user_upload/documents/tcpware/tcpware_spd.pdf.

* cited by examiner

BLOCKING DOWNLOAD OF CONTENT

CROSS REFERENCE TO OTHER APPLICATIONS

This application is a continuation of U.S. patent application Ser. No. 15/233,865, now U.S. Pat. No. 10,601,775, entitled BLOCKING DOWNLOAD OF CONTENT filed Aug. 10, 2016, which is a continuation of U.S. patent application Ser. No. 13/019,218, now U.S. Pat. No. 9,461,878, entitled BLOCKING DOWNLOAD OF CONTENT filed Feb. 1, 2011, both of which are incorporated herein by reference for all purposes.

BACKGROUND OF THE INVENTION

Existing computer security solutions typically fail to detect threats such as newer viruses whose signatures have not yet been identified. Improved techniques to thwart such threats would be useful.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Drive-by download of malware has become a ubiquitous security threat in computing. A user visiting a link or opening a file may be forced to also unknowingly download malicious code and/or content. For example, a web page downloaded by a user using a web browser may unknown to the user include malicious code that spawns a background process that automatically downloads and executes malware on the user device without being visible to the user. In many cases, users may not even be aware of when and where their devices got infected. Security software, such as antivirus software, may be employed to protect devices against known threats whose signatures are known but may not be very effective at preventing zero-day exploits whose signatures are not yet known. Improved techniques to thwart drive-by and other downloads of malware are disclosed herein.

Figure 1A:
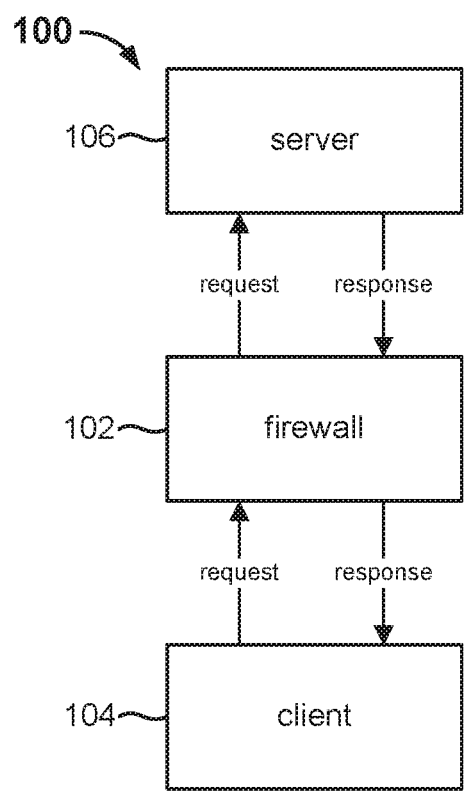
FIGS. 1A-1C are block diagrams illustrating an embodiment of a network environment in which downloads of unknown or untrusted content are not permitted without user consent.
Figure 1B:
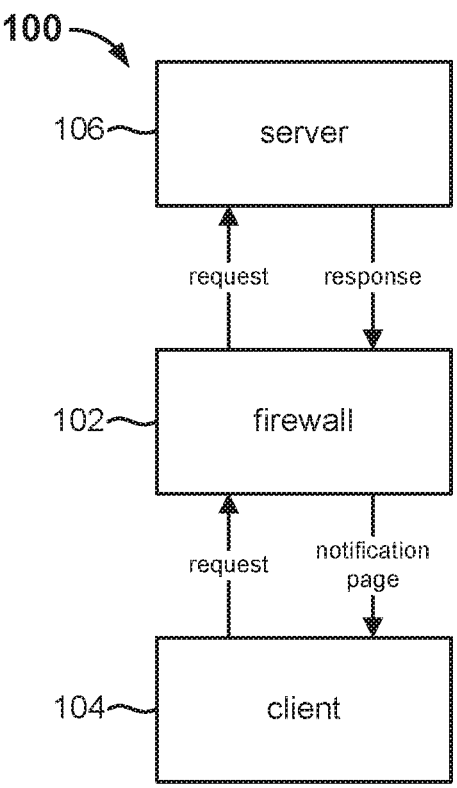
Figure 1C:
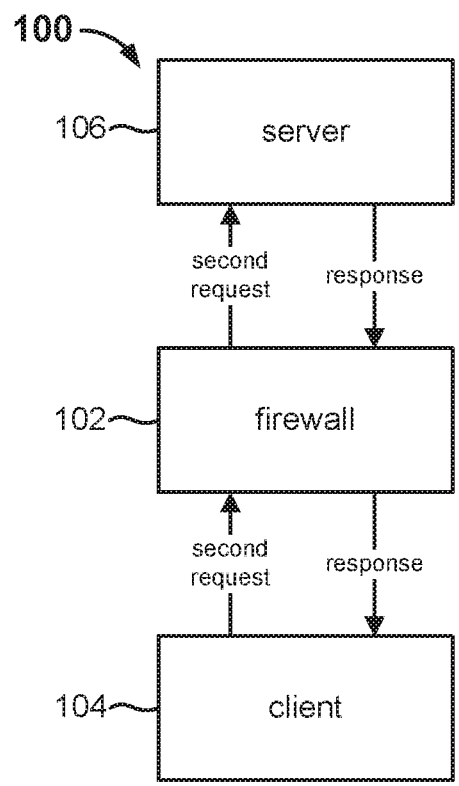

FIGS. 1A-1C are block diagrams illustrating an embodiment of a network environment 100 in which downloads of unknown or untrusted content are not permitted by firewall 102 without user consent. As depicted in the given example, messaging between client 104 and server 106 is facilitated by firewall 102, which intercepts and enforces a policy for communications between client 104 and server 106. In various embodiments, firewall 102 may comprise a dedicated device or appliance and/or software configured to provide firewall functionality. For example, firewall 102 may comprise any appropriate hardware and/or software configuration and/or components for proxying and/or processing communications between client 104 and server 106. In some embodiments, firewall 102 is part of a router or gateway device that facilitates communications between a private, internal network of which client 104 is a member and a public or other external network such as the Internet via which server 106 is accessible. Although depicted as a separate block in FIGS. 1A-1C, in other embodiments, firewall 102 may comprise a host-based firewall that is part of client 104. The various entities comprising network environment 100 may communicate over any combination of public and/or private networks such as a LAN, WAN, the Internet, etc., using any appropriate communication protocols such as HTTP (Hypertext Transfer Protocol), SSL (Secure Sockets Layer), FTP (File Transfer Protocol), etc.

Messaging between client 104 and server 106 is monitored by firewall 102. In the given example, a content request to server 106 from client 104 is intercepted by firewall 102 and forwarded by firewall 102 to server 106. In various embodiments, the content request may result from an action of a user of client 104 and/or an application or process running on client 104. A response from server 106 to the client request is initially received by firewall 102. In some embodiments, the response from server 106 is analyzed by firewall 102 to determine, for instance, whether the response is from a trusted or untrusted source and/or whether the response comprises safe or potentially suspect content such as an executable file download. If the response is determined by firewall 102 to be trusted, the response from server 106 is directly forwarded to client 104 as depicted in FIG. 1A.

However, if the response is determined by firewall 102 to be received from an unknown or untrusted source that, for example, is not included in a whitelist of trusted sources or is included in a blacklist of known malicious sources, and/or if the received response includes potentially suspect content, in some embodiments, firewall 102 drops the response and terminates the existing session between client 104 and server 106. In some such cases, firewall 102 instead forwards to client 104 a notification page as depicted in FIG. 1B that prompts the user of client 104 to accept or decline the server response. In some embodiments, the notification page comprises an HTML (HyperText Markup Language) page that is displayed at client 104 by a browser. In some embodiments, the notification page has an associated timer and expires if no response is received within a prescribed timeframe. By at least initially blocking potentially suspect content and acquiring user consent before downloading such content, firewall 102 provides a failsafe to prevent client 104 from inadvertently downloading malicious content. If the user of client 104 does not consent to the download and/or selects an option to decline the download via the notification page, the content is not downloaded to client 104, thus thwarting a potentially malicious backend process spawned on the client from downloading content that could be used to further infect or compromise the client.

If the suspect content is in fact legitimate, the user of client 104 may select an option in the notification page to accept the server response. In some cases, user selection of an option in the notification page to accept the server response results in a web browser of client 104 to send a second or subsequent request for the content to server 106 as depicted in FIG. 1C. In some cases, the second or subsequent request comprises a new session between client 104 and server 106 since in some embodiments a previous session between client 104 and server 106 is terminated or reset when the response from server 106 to the previous request from client 104 is dropped by firewall 102, e.g., in FIG. 1B. As further described below, in some embodiments, the second or subsequent request from client 104 includes an indication that the server response to the request has been approved for download by the user of client 104. In some embodiments, the indication comprises a cookie or other parameter that is set or configured and included with the second or subsequent request when the user of client 104 selects an option in the notification page to accept the server response. As depicted in FIG. 1C, firewall 102 receives the second or subsequent request from client 104 and forwards the second or subsequent request to server 106. A response from server 106 to the second or subsequent request from client 104 is recognized by firewall 102 as being approved by the user of client 104 and is thus forwarded to client 104.

In some embodiments, a response received from an unknown or untrusted source and/or determined to comprise suspect content is not immediately discarded by firewall 102 as described with respect to FIG. 1B but is instead temporarily locally stored or cached, e.g., in the proxy environment, by firewall 102 while a notification page is sent to client 104 for a user to verify the download. In such cases, if the user of client 104 selects an option to accept the download, the locally stored response from server 106 is forwarded by firewall 102 to client 104. In this embodiment, there may not be a need for a second or subsequent request from client 104 and a corresponding response from server 106 as described with respect to FIG. 1C. However, if the user of client 104 does not select an option to accept the download within a timeout window of the notification page and/or selects an option to decline the download, the locally stored response from server 106 is purged by firewall 102 and not forwarded to client 104.

Figure 2:
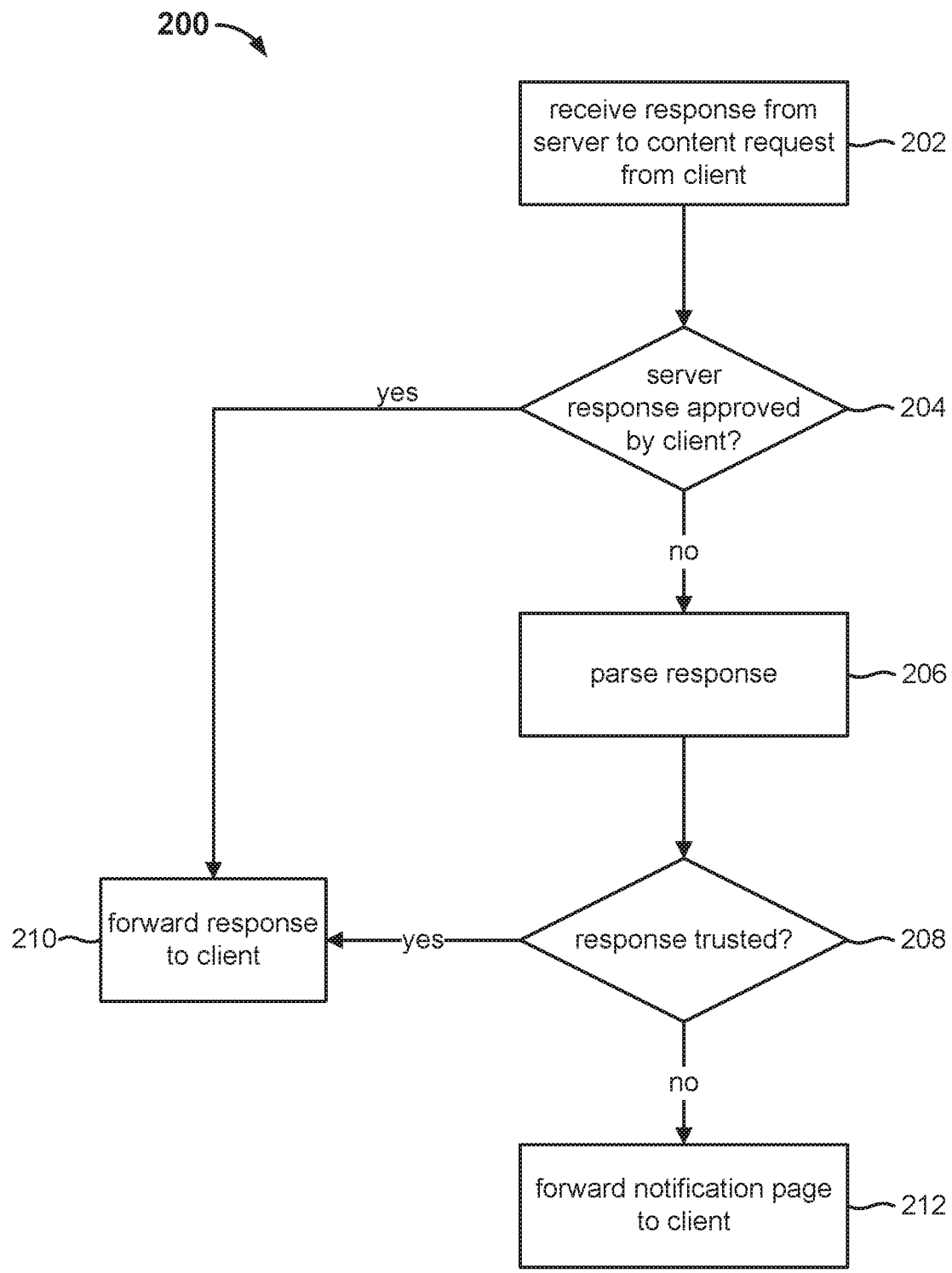
FIG. 2 is a flow chart illustrating an embodiment of a process for processing a response to a client request that is received from a server.

FIG. 2 is a flow chart illustrating an embodiment of a process for processing a response to a client request that is received from a server. In some embodiments, process 200 is employed by firewall 102 of FIGS. 1A-1C, for example, while monitoring HTTP and/or other traffic. Process 200 starts at 202 at which a response to a content request from a client is received from a server. At 204, it is determined whether the client has already approved the response, i.e., approved download of the content comprising the response, for example, via process 300 of FIG. 3. If it is determined at 204 that the response has not already been approved by the client, the response is parsed at 206. For example, step 206 may include parsing or decoding the response to extract information such as an associated URL (Uniform Resource Locator) or URI (Uniform Resource Identifier), header information such as information associated with the host or server from which the response is received, the type of content included in the response, etc. In some embodiments, step 206 includes determining whether the response comprises a file download, such as an executable file download.

At 208, it is determined whether the response is trusted based on a policy enforced by firewall 102. In some embodiments, step 208 includes determining whether the response is trusted based on the source of the response and/or the type of content included in the response. For example, a response may be deemed to be trusted if the source of the response is included in a whitelist of trusted applications or sources (e.g., Microsoft Updates, Java Updates, Adobe Updates, etc.) and may be deemed to be untrusted otherwise. Likewise, a response may be deemed to be untrusted if the source of the response is included in a blacklist of known malicious sites or otherwise untrusted sources. Such white and/or black lists for policing traffic crossing firewall 102 may be configured by the provider of firewall 102, may be individually configured by entities using firewall 102, and/or may be changed or updated over time as applicable. In some cases, the type of content included in the response may be employed to determine whether the response is trusted. For instance, a response that comprises an executable file may not be trusted from any source or if the source is not included in a whitelist of trusted sources. In some embodiments, determining whether the response is trusted is based at least in part on parsing the associated client request and determining, for example, whether the requested content is trusted and/or whether the host or server to which the request is directed is trusted, i.e., included in a whitelist.

If it is determined at 204 that the response has already been approved by the client or if it is determined at 208 that the response is trusted, the response is forwarded to the client at 210. If it is determined at 208 that the response is not trusted, the response is blocked from the client and instead a notification page informing the user of the client of the response and prompting the user to accept or decline the response is forwarded to the client at 212. In some embodiments, the notification page comprises an HTML page that is displayed at the client by a browser and provides user options to accept or decline the response. Code associated with the notification page may at least in part be encoded, obfuscated, and/or encrypted. In some embodiments, the notification page includes a unique identifier that is generated, for example, by firewall 102. In some such cases, the unique identifier comprises the value of a cookie. When a user selects an option of the notification page to accept the response, in some embodiments, a browser cookie is set to the unique identifier and provided with a second or subsequent request by the client for the content. In some embodiments, firewall 102 is configured to conclude that the response to the second or subsequent request is approved by a user of the client, for example, if the cookie value received in the second or subsequent request has not timed-out and matches the identifier provided with the notification page at 212. In some embodiments, step 212 includes terminating or dropping a current flow or session between the client and the server, which in some cases comprises sending a reset to the client and/or server. In some embodiments, step 212 includes dropping or discarding the response received at step 202. In other embodiments, the response received at step 202 may be temporarily stored and/or cached by firewall 102 so that the response can be forwarded to the client if the user of the client selects an option to accept the response.

Figure 3:
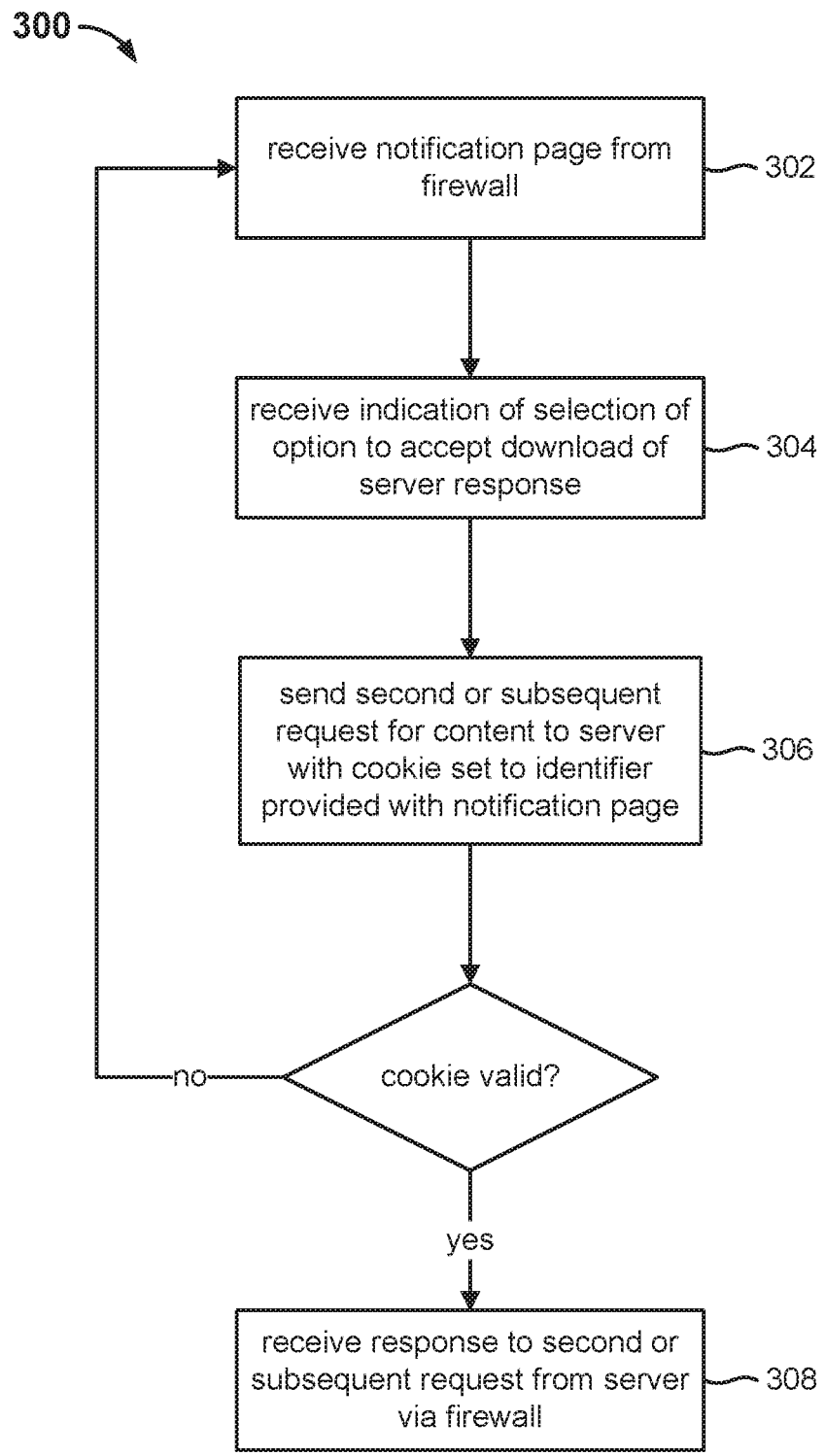
FIG. 3 is a flow chart illustrating an embodiment of a process for downloading content that is initially blocked by a firewall.

FIG. 3 is a flow chart illustrating an embodiment of a process for downloading content that is initially blocked by firewall 102. In some embodiments, process 300 is employed by client 104 of FIGS. 1A-1C. Process 300 starts at 302 at which a notification page is received by the client from firewall 102 that informs the user of the client of a server response to a content request from the client and prompts the user to accept or decline the response. At 304, an indication of a selection of an option of the notification page to accept download of the server response is received from a user of the client. In some embodiments, user selection of the option to accept the server response at 304 invokes a piece of JavaScript or other code of the notification page that sets a browser cookie value to a unique identifier associated with the notification page. At 306, a second or subsequent request for the content that includes the set cookie is sent by the client to the server. If the cookie is valid (e.g., if the cookie value has not timed out and/or if the cookie value matches the identifier of the notification page of step 302), a response to the second or subsequent request for the content is received by the client at 308 from the server via firewall 102. However, if the cookie is not valid (e.g., because the cookie value has timed out and/or if the cookie value does not match the identifier of the notification page of step 302), process 300 continues at 302 at which a new notification page with a new identifier is received from firewall 102. Although not shown in the flow chart of FIG. 3, if the user of the client does not respond to the notification page of 302 and/or selects an option of the notification page to decline the server response, the server response is effectively blocked by firewall 102 from being sent or downloaded to the client.

Figure 4:
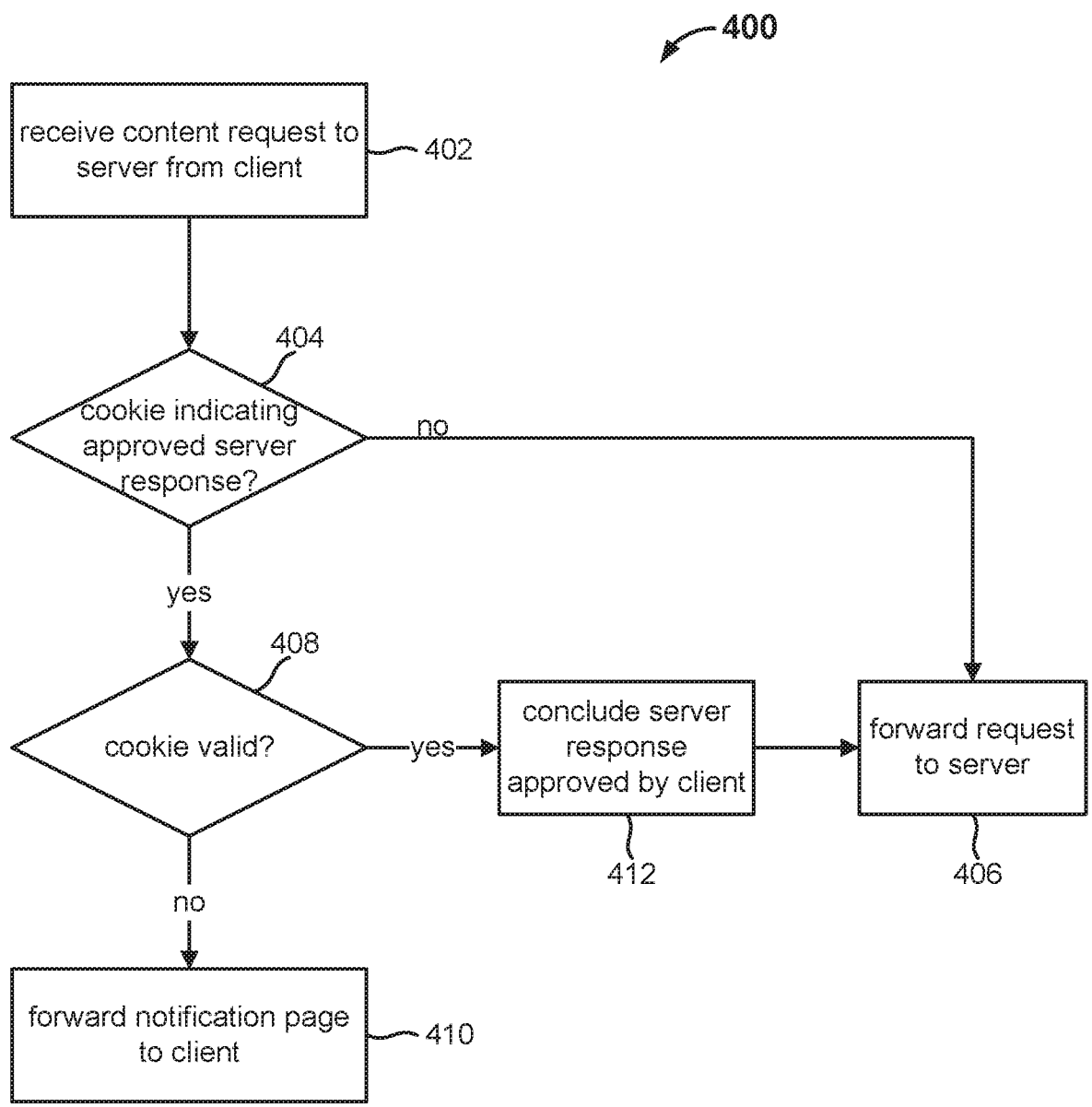
FIG. 4 is a flow chart illustrating an embodiment of a process for processing a client request.

FIG. 4 is a flow chart illustrating an embodiment of a process for processing a client request. In some embodiments, process 400 is employed by firewall 102 of FIGS. 1A-1C. Process 400 starts at 402 at which a content request from a client directed to a server is received or intercepted by firewall 102. At 404, the request is parsed to determine whether it includes a cookie (or other parameter or identifier) that indicates that a server response to the request has been approved by a user of the client. If it is determined at 404 that the request does not include such a cookie, the request is forwarded to the server at 406. If it is determined at 404 that the request includes such a cookie, it is determined at 408 whether the cookie is valid, e.g., by determining whether or not the cookie has timed-out and/or whether the cookie value matches an identifier included with a notification page previously sent to the client in response to a request for the same content as the request of 402. If it is determined at 408 that the cookie is not valid, a notification page that includes a new or different identifier is forwarded to the client at 410. If it is determined at 408 that the cookie value is valid, it is concluded at 412 that the server response to the request received at 402 has already been approved by the user of the client and that it is not to be blocked from the client, and the request from the client is subsequently forwarded to the server at 406.

Although some of the given examples describe using a cookie, any other appropriate technique to obtain and/or identify user approval of a server response may be employed in other embodiments. For example, in some embodiments, messages to and from firewall 102 may be handled at a client by a dedicated agent running on the client that also handles obtaining user verification for downloads of content. As described, by at least initially blocking untrusted content and injecting a user verification step for client downloads of such content, firewall 102 provides a mechanism to better protect a client from inadvertently downloading malware or other malicious content.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a response from a server to a request for content from a client;
determining that the response is untrusted;
at least initially blocking the response from being forwarded to the client; and
providing instead to the client a notification page with options to accept or decline the response;
wherein untrusted content is not permitted at the client without user approval, wherein an indication of user approval is provided with a subsequent request for the same content from the client that is generated in response to user selection of an option to accept in the notification page, and wherein user approved content is forwarded to the client in response to the subsequent request.

2. The method of claim 1, wherein at least initially blocking untrusted responses, including the received untrusted response, protects the client from inadvertently downloading malicious content.

3. The method of claim 1, wherein at least initially blocking untrusted responses, including the received untrusted response, facilitates blocking new security threats whose signatures are not yet known.

4. The method of claim 1, wherein at least initially blocking untrusted responses, including the received untrusted response, facilitates blocking zero-day exploits.

5. The method of claim 1, wherein the method is employed by a firewall that monitors and enforces a policy for communications between the client and the server.

6. The method of claim 1, further comprising intercepting the request for content from the client and forwarding the request for content to the server.

7. The method of claim 1, further comprising analyzing the response.

8. The method of claim 1, wherein determining that the response is untrusted comprises determining that the response is unknown.

9. The method of claim 1, wherein determining that the response is untrusted comprises determining that the response comprises potentially suspect content.

10. The method of claim 1, wherein determining that the response is untrusted comprises determining that the response comprises an executable file download.

11. The method of claim 1, wherein determining that the response is untrusted comprises determining that the server is untrusted.

12. The method of claim 1, wherein determining that the response is untrusted comprises determining that the server is unknown.

13. The method of claim 1, wherein determining that the response is untrusted comprises determining that the server is not included in a whitelist of trusted sources or is included in a blacklist of known malicious sources.

14. The method of claim 1, wherein blocking the response comprises dropping the response.

15. The method of claim 1, wherein blocking the response comprises terminating an existing session between the client and the server.

16. The method of claim 1, further comprising temporarily storing the response for potential later delivery to the client and wherein user approved content forwarded to the client in response to the subsequent request comprises the temporarily stored response.

17. The method of claim 1, wherein the subsequent request comprises a new session between the client and the server.

18. The method of claim 1, further comprising forwarding to the server the subsequent request from the client and receiving a subsequent response from the server and wherein user approved content forwarded to the client in response to the subsequent request comprises the subsequent response from the server.

19. A system, comprising:
a processor configured to:
receive a response from a server to a request for content from a client;
determine that the response is untrusted;
at least initially block the response from being forwarded to the client; and
provide instead to the client a notification page with options to accept or decline the response;
wherein untrusted content is not permitted at the client without user approval, wherein an indication of user approval is provided with a subsequent request for the same content from the client that is generated in response to user selection of an option to accept in the notification page, and wherein user approved content is forwarded to the client in response to the subsequent request; and
a memory coupled to the processor and configured to provide the processor with instructions.

20. The system of claim 19, wherein at least initially blocking untrusted responses, including the received untrusted response, protects the client from inadvertently downloading malicious content.

21. The system of claim 19, wherein at least initially blocking untrusted responses, including the received untrusted response, facilitates blocking new security threats whose signatures are not yet known.

22. The system of claim 19, wherein at least initially blocking untrusted responses, including the received untrusted response, facilitates blocking zero-day exploits.

23. The system of claim 19, wherein the system comprises a firewall that monitors and enforces a policy for communications between the client and the server.

24. The system of claim 19, wherein the processor is further configured to intercept the request for content from the client and forward the request for content to the server.

25. The system of claim 19, wherein the processor is further configured to analyze the response.

26. The system of claim 19, wherein to determine that the response is untrusted comprises to determine that the response is unknown.

27. The system of claim 19, wherein to determine that the response is untrusted comprises to determine that the response comprises potentially suspect content.

28. The system of claim 19, wherein to determine that the response is untrusted comprises to determine that the response comprises an executable file download.

29. The system of claim 19, wherein to determine that the response is untrusted comprises to determine that the server is untrusted.

30. The system of claim 19, wherein to determine that the response is untrusted comprises to determine that the server is unknown.

31. The system of claim 19, wherein to determine that the response is untrusted comprises to determine that the server is not included in a whitelist of trusted sources or is included in a blacklist of known malicious sources.

32. The system of claim 19, wherein to block the response comprises to drop the response.

33. The system of claim 19, wherein to block the response comprises to terminate an existing session between the client and the server.

34. The system of claim 19, wherein the processor is further configured to temporarily store the response for potential later delivery to the client and wherein user approved content forwarded to the client in response to the subsequent request comprises the temporarily stored response.

35. The system of claim 19, wherein the subsequent request comprises a new session between the client and the server.

36. The system of claim 19, wherein the processor is further configured to forward to the server the subsequent request from the client and receive a subsequent response from the server and wherein user approved content forwarded to the client in response to the subsequent request comprises the subsequent response from the server.

37. A computer program product embodied in a non-transitory computer readable medium and comprising computer instructions for:
receiving a response from a server to a request for content from a client;
determining that the response is untrusted;
at least initially blocking the response from being forwarded to the client; and
providing instead to the client a notification page with options to accept or decline the response;
wherein untrusted content is not permitted at the client without user approval, wherein an indication of user approval is provided with a subsequent request for the same content from the client that is generated in response to user selection of an option to accept in the notification page, and wherein user approved content is forwarded to the client in response to the subsequent request.

38. The computer program product of claim 37, wherein at least initially blocking untrusted responses, including the received untrusted response, protects the client from inadvertently downloading malicious content.

39. The computer program product of claim 37, wherein at least initially blocking untrusted responses, including the received untrusted response, facilitates blocking new security threats whose signatures are not yet known.

40. The computer program product of claim 37, wherein at least initially blocking untrusted responses, including the received untrusted response, facilitates blocking zero-day exploits.

41. The computer program product of claim 37, wherein the computer program product comprises a firewall that monitors and enforces a policy for communications between the client and the server.

42. The computer program product of claim 37, further comprising computer instructions for intercepting the request for content from the client and forwarding the request for content to the server.

43. The computer program product of claim 37, further comprising computer instructions for analyzing the response.

44. The computer program product of claim 37, wherein determining that the response is untrusted comprises determining that the response is unknown.

45. The computer program product of claim 37, wherein determining that the response is untrusted comprises determining that the response comprises potentially suspect content.

46. The computer program product of claim 37, wherein determining that the response is untrusted comprises determining that the response comprises an executable file download.

47. The computer program product of claim 37, wherein determining that the response is untrusted comprises determining that the server is untrusted.

48. The computer program product of claim 37, wherein determining that the response is untrusted comprises determining that the server is unknown.

49. The computer program product of claim 37, wherein determining that the response is untrusted comprises determining that the server is not included in a whitelist of trusted sources or is included in a blacklist of known malicious sources.

50. The computer program product of claim 37, wherein blocking the response comprises dropping the response.

51. The computer program product of claim 37, wherein blocking the response comprises terminating an existing session between the client and the server.

52. The computer program product of claim 37, further comprising computer instructions for temporarily storing the response for potential later delivery to the client and wherein user approved content forwarded to the client in response to the subsequent request comprises the temporarily stored response.

53. The computer program product of claim 37, wherein the subsequent request comprises a new session between the client and the server.

54. The computer program product of claim 37, further comprising computer instructions for forwarding to the server the subsequent request from the client and receiving a subsequent response from the server and wherein user approved content forwarded to the client in response to the subsequent request comprises the subsequent response from the server.

* * * * *